US012519800B1

(12) United States Patent
Janakiraman et al.

(10) Patent No.: US 12,519,800 B1
(45) Date of Patent: Jan. 6, 2026

(54) ADMINISTRATOR-AUTHORIZED APPLICATIONS DURING VIDEO CONFERENCING

(71) Applicant: Zoom Video Communications, Inc., San Jose, CA (US)

(72) Inventors: Arun Janakiraman, San Francisco, CA (US); Shishir Sharma, Ontario, CA (US)

(73) Assignee: Zoom Communications, Inc., San Jose, CA (US)

( * ) Notice: Subject to any disclaimer, the term of this patent is extended or adjusted under 35 U.S.C. 154(b) by 208 days.

(21) Appl. No.: 18/361,413

(22) Filed: Jul. 28, 2023

(51) Int. Cl.
| G06F 15/16 | (2006.01) |
| H04L 9/40 | (2022.01) |
| H04L 12/18 | (2006.01) |

(52) U.S. Cl.
CPC ........ H04L 63/105 (2013.01); *H04L 12/1813* (2013.01)

(58) Field of Classification Search
CPC .. H04L 63/105; H04L 63/107; H04L 12/1813
USPC .............. 726/4, 21; 709/204–205
See application file for complete search history.

(56) References Cited

U.S. PATENT DOCUMENTS

| 8,925,052 | B2* | 12/2014 | Deagon | H04L 63/0815 726/4 |
| 11,910,131 | B1* | 2/2024 | DuBois | H04N 7/15 |
| 12,184,651 | B2* | 12/2024 | Pike | H04L 63/0884 |
| 2016/0072790 | A1* | 3/2016 | Stuntebeck | H04L 63/105 726/4 |
| 2016/0132806 | A1* | 5/2016 | To | G06Q 10/06313 705/7.23 |
| 2023/0025638 | A1* | 1/2023 | Gandhi | H04L 65/612 |
| 2024/0232750 | A1* | 7/2024 | Crabbe | G06Q 10/06312 |

* cited by examiner

*Primary Examiner* — Bharat Barot
(74) *Attorney, Agent, or Firm* — Kilpatrick Townsend & Stockton, LLP

(57) ABSTRACT

Techniques for providing administrator-authorized applications are provided. In an example method, a computing device accesses a first application configuration for a first application. The computing device receives a first request to access a resource by the first application on behalf of one or more users and requests, from an authorization provider, authorization to access the resource by the first application on behalf of the one or more users. The computing device receives the authorization and updates the first application configuration with information about the authorization. The computing device receives a first indication from a first client device associated with a first user to add the first application to the first client device and determines a user authorization for the first user to access the resource using the first application based on the information about the authorization. The computing device provides access to the resource based on the user authorization.

20 Claims, 10 Drawing Sheets

ADMINISTRATOR-AUTHORIZED APPLICATIONS DURING VIDEO CONFERENCING

FIELD

The present application generally relates to authentication and authorization, and more particularly relates to techniques for administrator-authorized applications during video conferencing.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
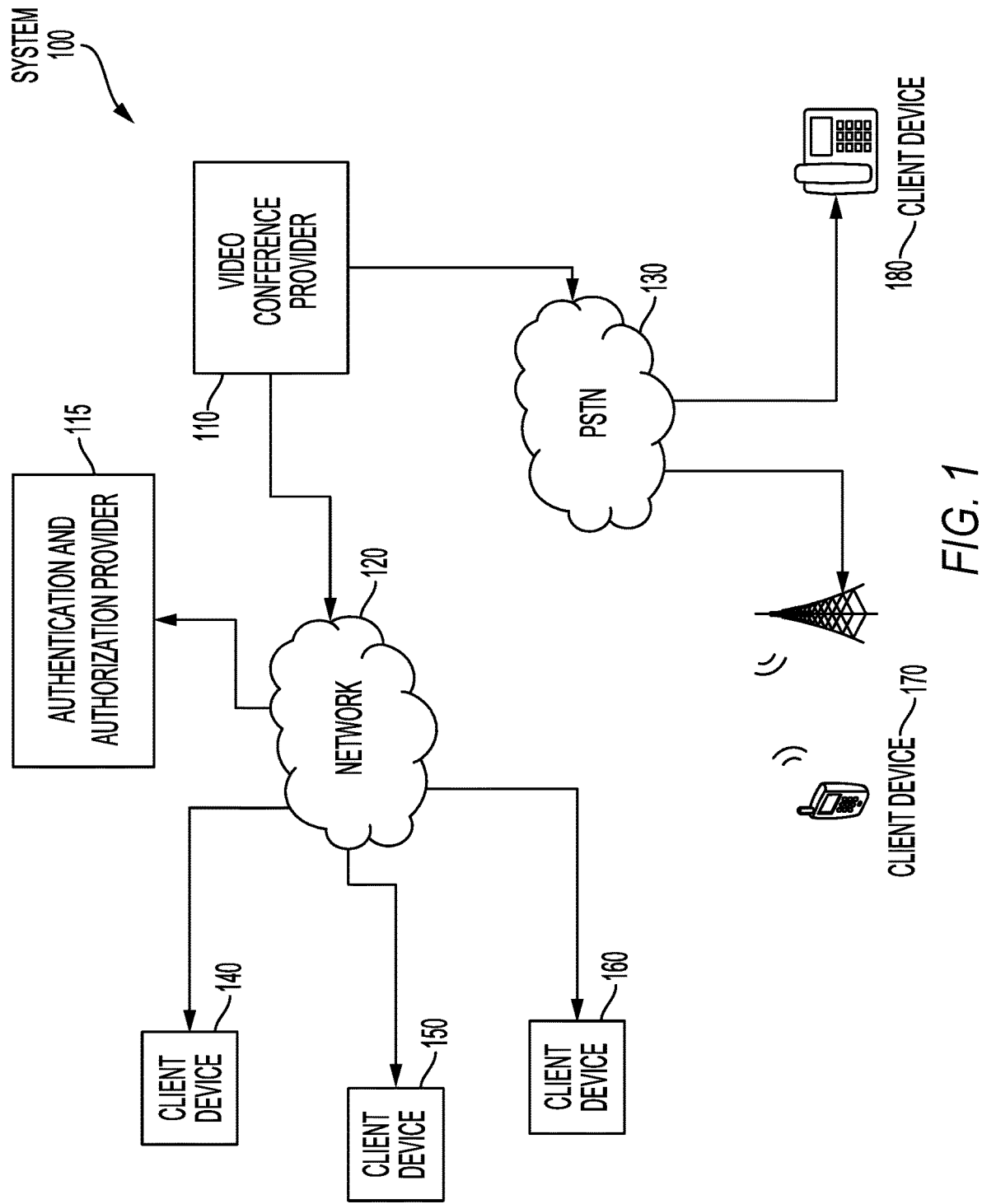
FIG. 1 shows an example system that provides videoconferencing functionality to various client devices.

Examples are described herein in the context of techniques for providing administrator-authorized applications during video conferencing. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Building on the growth of video conferencing as a pillar of personal and enterprise communications, add-on applications and integrations constitute an important way in which the capabilities of video conferencing software can be extended. Such applications and integrations can leverage the ongoing growth of social networks and other webs of connected software that bind together video conference participants in our modern networked society. For example, video conference client software extensions like third-party applications or integrations may be used for such varied purposes as social networking, enhanced screen sharing, note taking, chatting, polling, scheduling, and so on.

Some video conferencing client software includes the capability to install applications or to add integrations. For example, a user of a client device executing the video conferencing client software may use a marketplace application to select a chat application for use during video conferences. In some cases, the chat application is downloaded to the client device. In other cases, an integration may be added to the client device that connects the client device with a chat application hosted on a remote server.

In either case, the application or integration may require access to protected resources hosted by the video conference provider. For example, the video conference provider may store information relating to user accounts, profiles, payment information, preferences, and so on. The video conference provider may provide access to the protected resources only under limited conditions. Specifically, access to protected resources may be allowed only when a particular user has given explicit consent or authorization for such access. In some cases, such explicit consent may be delegable, as when, for example, a user is a member of a group or organization with trusted administrators enforcing security and corporate policies.

For example, in the organizational context, an organization administrator may install applications on behalf of organization users. This may be required when, for instance, members of a corporate organization all use a particular whiteboarding application during video conferencing. It may be desirable for corporate system administrators to, for example, pre-install the application for new organization members, both for convenience and to enforce security policies.

During installation, the application may require explicit authorization from the new user to access protected resources on the video conference provider. However, the user might not be available to make such an authorization prior to joining the organization, making pre-installation impossible. Or the user may lack the technical ability to perform the installation or to make judgements regarding the security implications of installation actions (e.g., a confusing list of requirement permissions for an application). This can be worked around by granting authorization for the application to access protected resources with greater scope than is required for a single user. For instance, authorization for protected resource access with administrator scope can be granted. Access with administrator scope may include access to more data or have more privileges than is required to operate the application for a normal user.

But this contravenes a fundamental principle of network security: users, processes, and programs should only be given the minimum level of access, permissions, and authorities needed to perform their intended function. For example, granting the application access to the protected resources with administrator scope risks a significantly more damaging data breach in the event the application is compromised or runs malicious code.

Techniques for administrator-authorized applications during video conferencing are provided that can allow organization administrators to grant explicit authorization on behalf of a user, limiting the scope of the authorization grant to the specific user, when the user has delegated the granting of such permissions to an organizational administrator. For instance, a member of a corporate organization may delegate the granting of authorizations to a corporate system or network administrator upon joining the organization.

In an example method, a computing device like a video conference provider accesses an application configuration for an application. This example involves an application but applies equally to an integration. The application may be a chat application, a social media integration, a calendaring application, a game, and so on. The application configuration may be configured by, for example, an organization administrator, like a system administrator. The system administrator may be, for example, an individual responsible for managing the organization's users and their respective client devices.

The application configuration may include a set of configuration details that are applicable to a number of client devices that the system administrator is responsible for. For example, a system administrator may be responsible for managing the configuration of numerous client devices that may engage in video conferences hosted by the video conference provider. The application configuration can be the means by which organization administrators provide access to the application for the organization's members and their respective client devices.

The video conference provider next receives a request to access a resource by the application on behalf of one or more users. For example, one example application may be an application that adds social media functionality to video conferences. The application may require access to user profile information stored by the video conference provider. In this example, the protected resource is the user profile information. The organization administrator may use a tool provided by the video conference provider to request access to the user profile information on behalf of the organization members. The tool can be used to specify various subsets of the users and groups associated with the organization. If such access is obtained for some or all members of the organization, they may be able to add the application to their respective client devices without granting authorization individually since the organization administrator will have obtained such access already on their behalf.

Upon receipt of the request, the video conference provider requests, from an authorization provider, authorization to access the resource by the application on behalf of the one or more users. For example, the authorization provider may be an authorization server maintained by the video conference provider or may be a third-party identity provider that provides authentication and authorization services to the video conference provider. The video conference provider may use a standard authentication and authorization protocol such as Open Authorization 2.0 (OAuth2) or Security Assertion Markup Language (SAML) to request access.

The video conference provider, after following a procedure defined by the standard authentication and authorization protocol, receives, from the authorization provider, the authorization to access the resource by the application on behalf of the one or more users. The video conference provider then updates the application configuration with information about the authorization. For example, the video conference provider may store an access token, like a randomly generated password, associated with the application that can be used to provide access to the resource when requested by client devices.

The video conference provider later receives an indication from a client device and user specifying the user's desire to add the application to the client device. For example, the user may visit an app marketplace provided by the video conference provider and select a control (e.g., click a button) indicating a desire to install an application that adds social media functionality to video conferences. Or the organization administrator may execute instructions to cause certain applications used by the organization to be pre-installed or automatically installed on some client devices. In either case, the application may require access to a protected resource, like user profile data, hosted by the video conference provider, to start executing or to function properly.

In this example, access to the protected resource required by this application has already been authorized on behalf of the user. However, the client device lacks the credentials needed to demonstrate that the authorization has been obtained. Thus, the video conference provider must determine that a valid user authorization to access the protected resource using the application exists based on information included in the indication received from the client device.

The video conference provider sends a request to the authorization provider including information authenticating itself (the video conference provider) to the authorization provider like a client secret (e.g., a random password). The video conference provider also provides information about the requesting application, client device, user, and other relevant information. The authorization provider validates the request and verifies that a valid authorization grant exists. In some examples, the authorization provider may perform an abbreviated or "short-circuited" version of standard authorization protocols to support administrator-authorized applications during video conferencing. Such a procedure allows the video conference provider to obtain the credentials needed for the application to access the protected resource without requiring any additional or repeated manual authorization steps by either the administrator or the user. Such credentials may take the form of an access token (e.g., a randomly generated password).

The access token is then sent to the client device. Using the access token, the application executing on the client device can request and the video conference provider can provide, to the client device, access to the protected resource based on the user authorization previously obtained on behalf of the user of the client device. The user can thus proceed to use the application, along with the functionality requiring access to the protected resource, without providing any additional authorization.

In some examples, the example just described may be completely transparent to the user of the client device. Only the organization administrator needs to perform any manual authorization or configuration steps relating to access to protected resources by the application on behalf of the specified one or more users. The user is able to install and use (or begin using, in the case of a pre-installed application) the application without taking any apparent steps relating to authorization to access protected resources.

The innovations of the present disclosure provide significant improvements in the technical field of authentication and authorization technologies. Organization-level management of authorization to sensitive resources requires striking a balance between security requirements and practicality (e.g., ease of use). Prior to the innovations of the present disclosure, a typical configuration weighed heavily on the side of practicality by providing authorization on behalf of groups of users using administrator-scoped permissions. However, such an approach violates the bedrock principle of least privilege in a security context, giving applications far more access than is needed, thus greatly expanding the consequences of a client-side security breach.

The techniques of the present disclosure enable organization administrators to authorize access to protected resources on behalf of users using an appropriate, minimal scope (e.g., a user scope with only the permissions needed by the application). Such access can be obtained seamlessly, without any friction experienced by a user of a client device, when authorization is explicitly delegated to administrators, as is typical in organizational or corporate settings. The techniques can enable the pre-installation or simple installation of client software applications without the added time, inconvenience, and confusion lent by a requirement for users to provide manual authorization. Moreover, the authorization itself is maintained by the video conference provider, which can enable the video conference provider to use and renew the authorization as needed, again in a manner that is transparent to the user. Thus, even when subsequent authorizations are required to access the protected resource, the short-circuit mechanism utilized by the techniques described herein obviate the need for additional user input with respect to application authorization.

Additionally, the maintenance of authorization requests, grants, scopes, included users, and so on can be administered via the video conference provider, granting organization administrators a high degree of control and central point from which to administer organization-level security policy. Conversely, maintainers of applications benefit from the centralized administration of security policy and improved user experience obtained through the use of administrator-authorized applications during video conferences. In the workflow provided by the techniques disclosed herein, the reduction in friction stemming from the absence of confusing security messages means that more users may use the application, may obtain access to the application faster, and may need to follow less steps to before the application can be used. The video conferencing user experience is also enhanced through the presence of more readily available applications. Using existing techniques, video conference participants may not have had added applications available during a video conference due to failed authorization attempts, lack of knowledge, required refreshes, and other similar problems. Communication and collaboration may be negatively impacted under such circumstances. Using the innovations of the present disclosure, the user experience may be seamless and all video conference participants may be able to use the required, organization-endorsed (or mandated) applications during the video conference with no unavailability due to authorization issues.

These illustrative examples are given to introduce the reader to the general subject matter discussed herein and the disclosure is not limited to these examples. The following sections describe various additional non-limiting examples and examples of techniques for administrator-authorized applications.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
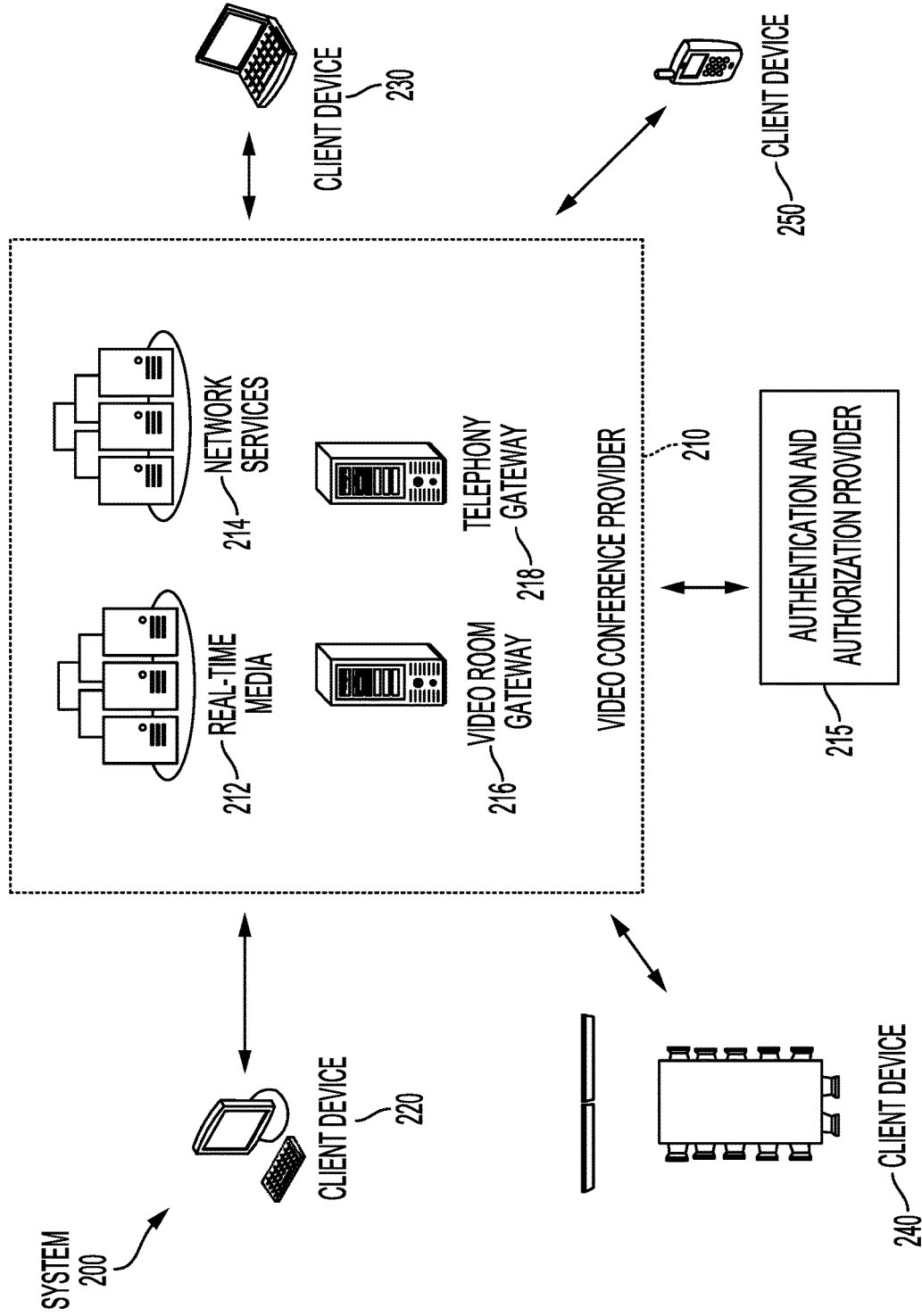
FIG. 2 shows an example system in which a video conference provider provides videoconferencing functionality to various client devices.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
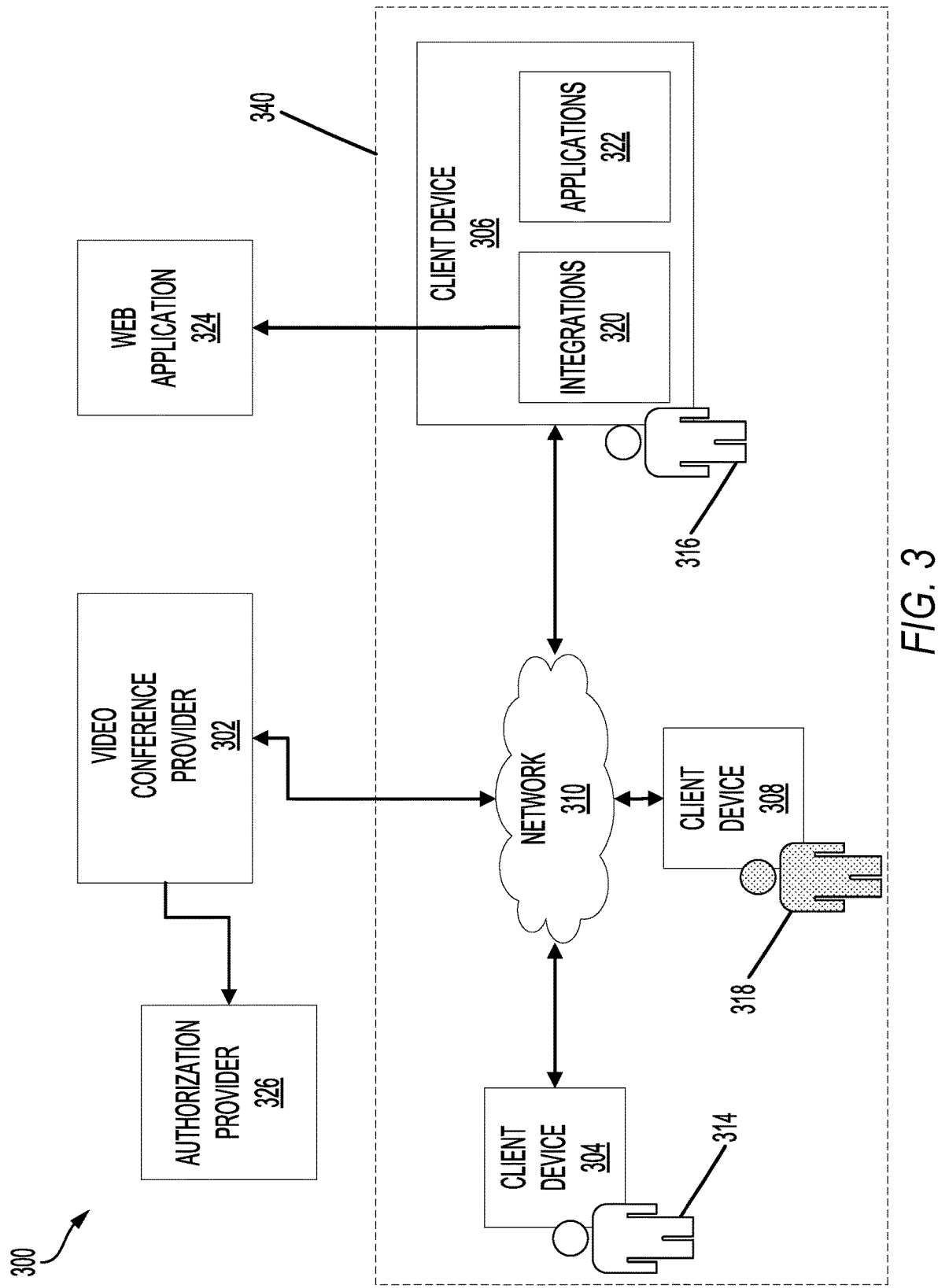
FIG. 3 shows an example of a system providing administrator-authorized applications during video conferencing, according to some aspects of the present disclosure.

Referring now to FIG. 3, FIG. 3 shows an example of a system 300 providing administrator-authorized applications in the context of video conferencing, according to some aspects of the present disclosure. One or more client devices 304, 306 are communicatively coupled with a video conference provider 302. For example, the client devices 304, 306 may be coupled to the video conference provider 302 over a network 310. The network 310 can include public networks, private networks, the Internet, or any other suitable combination of networked devices. For example, the client devices 304, 306 may communicate with the video conference provider 302 over network 310 by establishing a TCP/IP or a UDP/IP connection to facilitate the exchange of packets between client applications (e.g., video conferencing software) and one or more servers hosted by video conference provider 302.

In example system 300, the video conference provider 302 is hosting a video conference with one or more participating client devices 304, 306. A plurality of client devices and their associated video conference participants may join together to participate in a video conference. For instance, example system 300 depicts two client devices 304, 306 with users 314, 316 participating in a video conference. A video conference may include the video and audio streams of each participant being sent from each respective client device to the video conference provider 302 and then to the client devices 304, 306 of the remaining participants.

System 300 also includes administrator 318 managing the group 340 of users 314, 316 shown inside the dotted line in FIG. 3. Administrator 318 uses client device 308, which is communicatively coupled to video conference provider 302 via network 310, for performing group 340 administrative tasks including implementing security procedures, onboarding, software installation and upgrades, and so forth for group 340. Group 340 may be a logical grouping of users 314, 316 established by the video conference provider 302 and does not necessarily have a physical correlate. Thus, the members of group 340 may be geographically disparate.

Turning now to a particular client device 306, the client device 306 may be a personal computer, laptop, smartphone, tablet, or similar device. Client device 306 may include a display device and one or more input devices. Client device 306 may also include video conferencing client software for conducting video conferences. The client device 306 may have a user 316 who may be a video conference participant, along with user 314 and others.

The client device 306 may include one or more integrations 320 or applications 322 to be used in concert with the video conferencing client software. Integrations 320 and applications 322 may execute, for example, in the application context of the video conferencing client software. In a typical example, the video conference provider may provide an application programming interface (API) to third-parties for the development of integrations 320 and applications 322 that can run alongside or within the video conferencing client software.

Integrations 320 can include program code and information for enabling a user 316 of client device 306 to access a web application 324 or other remotely-executed application from the client device 306. In some examples, the integrations 320 serving this function may be referred to as cloud connectors. For example, a third party may provide a web application 324 including a calendar application. The third party can make the calendar application available from within the video conferencing client software to user 316 by providing an integration 320. The integration 320 may, for example, use JavaScript to render a graphical user interface (GUI) from within the video conferencing client software using a GUI framework provided by the video conference provider 302.

Similarly, applications 322 may be standalone executables or software packages that can run in the context of the video conferencing client software. For instance, the video conference provider 302 may provide a marketplace for applications whereby users can select and download applications 322 that can run on client devices 304, 306 to extend the capability of those client devices 304, 306. For example, a third party may develop a calendar application and make it available for download using a marketplace application. A user 316 can download the calendar application software package to client device 306 and provide an indication to execute the calendar application by, for instance, clicking an icon. The calendar application may then run as a sub-process of the video conferencing application, or other suitable executory approach, and provide native calendaring functionality from within the client device 306.

In the case of both integrations 320 and applications 322 in the context of video conferencing operations, a typical use case involves the use of data stored by the video conference provider 302. For example, a calendaring integration 320 or application 322 may make use of video conference scheduling data, profile data, previously stored calendar data, and so on. The video conference provider 302 may provide facilities for securely accessing such data by integrations 320 and applications 322. For example, the video conference provider 302 may provide a web-based API for access to such data.

Data of this type, however, raises primary security concerns and access to it is generally carefully controlled using rigorous authentication and authorization protocols. Such protocols protect resources like the examples of personal data previously mentioned from misuse, abuse, loss, or spillage. Thus, for example, an integration 320 or application 322 cannot access a protected resource without first authenticating (e.g., proving that it is the user/application it claims to be using a secret security token) and then receiving explicit authorization to access the protected resource (e.g., receiving a secret security token that allows a specific entity access to a particular protected resource under certain circumstances).

Example system 300 includes authorization provider 326 for the performance of the latter of these two functions, although in some examples, an authentication provider and the authorization provider 326 may be combined. The authorization provider 326 may include subsystems for granting integrations 320 and applications 322 access to protected resources held by video conference provider 302. The authorization provider 326 may be hosted by the video conference provider 302 but in some examples can be provided by a third-party service. For example, a full-featured identity provider may be used to provide authentication, authorization, identity, and profile services.

Authorization provider 326 may include a web-based API for implementing standard authentication and authorization protocols by various server and client devices. For example, the authorization provider may use a standard protocol such as OAuth2 or OpenID Connect. For example, OAuth2 can be used for authorization, or the provision of secured delegated access to protected resources using the Hypertext Transfer Protocol (HTTP) protocol as the underlying carrier of the protocol messages. Using OAuth2, the authorization provider 326 can control access to protected resources (e.g., profile data stored by the video conference provider 302) by third-party applications using a process that requires the user 316 or a delegated administrator 318 to approve the authorization without the need for either the user 316 or the administrator to share credentials with the third-party applications.

In some examples, the video conference provider 302 includes memory devices like databases that may store the protected resources. In other examples, the protected resources may be stored in a remote location, like a cloud storage location, but access to the protected resource is still controlled by the video conference provider 302 by way of the authorization provider 326 services. In a typical configuration, the video conference provider 302 may provide a web-based API for communications with integrations 320 and applications 322, which may then proxy certain authorization-related requests to the authorization provider 326.

In some examples, as mentioned above, the OAuth2 protocol may be used to provide authorization to access protected resources by integrations 320 and applications 322. In a typical OAuth2 authorization flow, the integration 320 or application 322 makes a request to the video conference provider 302 to access protected resources from a web interface. The request may be proxied to the authorization provider 326. The request may include the level or type of access required, known as the scope. The authorization provider 326 may respond with a redirect to a user interface that allows the user 316 to authenticate if necessary and then provide explicit authorization to access the protected resources under specified conditions. For instance, the user 316 may allow access to certain resources but not others or may allow read access but not write access. The explicit authorization is again proxied to the authorization provider 326 which then responds with an authorization grant, typically in the form of an authorization code. The authorization code is a secret credential representing the user's permission to access the protected resources. In some examples, the authorization code is an alphanumeric string.

Continuing with the typical OAuth2 flow, this authorization code can be exchanged by the integration 320 or application 322 for an access token by making another request to the video conference provider 302 web-based API. The request may again be proxied to the authorization provider 326 which may respond with an access token. In some examples, the access token can be an alphanumeric string that encodes specific scope, lifetime, and other access attributes. The access token can be used by the integration 320 or application 322 to make authorized requests on behalf of the user 316 to access the protected resource. For example, an integration 320 or application 322 may request a protected resource from the video conference provider 302 and provide the access token along with the request. The video conference provider 302 may proxy the request to the authorization provider 326 and receive confirmation that the authorization is valid. If the authorization provider 326 confirms that the access token is valid, the video conference provider 302 can serve the requested protected resource to the integration 320 or application 322.

In some examples, the access token is short-lived and can expire after a specified period of time. Following expiration of the access token, the user 316 may have to provide authorization again, as just described. In a typical OAuth2 flow, the integration 320 or application 322 can obtain an updated access token using a refresh token provided by the authorization provider 326 earlier in the process. This refresh token can then be used to acquire a new access token without requiring the user to repeat the explicit grant of authorization.

However, storing a refresh token by the integration 320 or application 322 may present unacceptable security risks in some cases. Moreover, the user experience may be degraded if the integration 320 or application 322 cannot continue to access protected resources on behalf of user 316 though authorization has been given, merely because the client device 306 is unavailable. Thus, repetition of the explicit grant of authorization by the user 316 may be required in some cases.

In some examples, as when the user 316 has explicitly delegated certain authorization privileges to an administrator 318, the explicit grant of authorization by the user can be "short-circuited." In these examples, the integration 320 or application 322 makes a request to the video conference provider 302 to access protected resources from a web interface. This request may be the initial request, following installation or pre-installation of the integration 320 or application 322, or a subsequent request following expiration of the access token. The request may be proxied to the authorization provider 326. The request may include the level or type of access required, or scope of the request. The short-circuit process proceeds on the basis of authorization previously granted by the user 316 or explicitly delegated to an administrator 318 and granted on behalf of the user 316. The short-circuited authorization is again proxied to the authorization provider 326 which then responds with, for example, an authorization code, which can be exchanged for an access token as previously described.

In system 300, administrator-authorized applications during video conferencing can be implemented through delegation of the OAuth authorization process to administrator 318. For example, administrator 318 can use a tool provided by the video conference provider 302 to edit an application configuration to request authorization for one or more users to access a protected resource using a particular application.

The one or more users may be specified individually, as members of groups, by location, by tag, or any other suitable means of identifying users or groups of users. In some examples, multiple applications can be edited together. For example, an application configuration may apply to one or more applications. In this case, authorization for access to protected resources on behalf of one or more users can be granted to multiple applications simultaneously. A single authorization grant may be scoped to multiple applications or multiple grants to respective single applications may be issued together.

The video conference provider 302 can request authorization for the one or more users to access the protected resource from the authorization provider 326. In some examples, the request made by the administrator 318 is proxied to the authorization provider 326. The authorization request may include information that authenticates the video conference provider 302 to the authorization provider 326, like a client ID or client secret. The authorization provider 326 may authenticate the video conference provider 302 and validate the authorization request. Authorization in the form of an authorization code or access token may then be provided to the video conference provider 302 to use on behalf of the users 314, 316 of client devices 304, 306, when needed by an application 322 or integration 320.

Figure 4A:
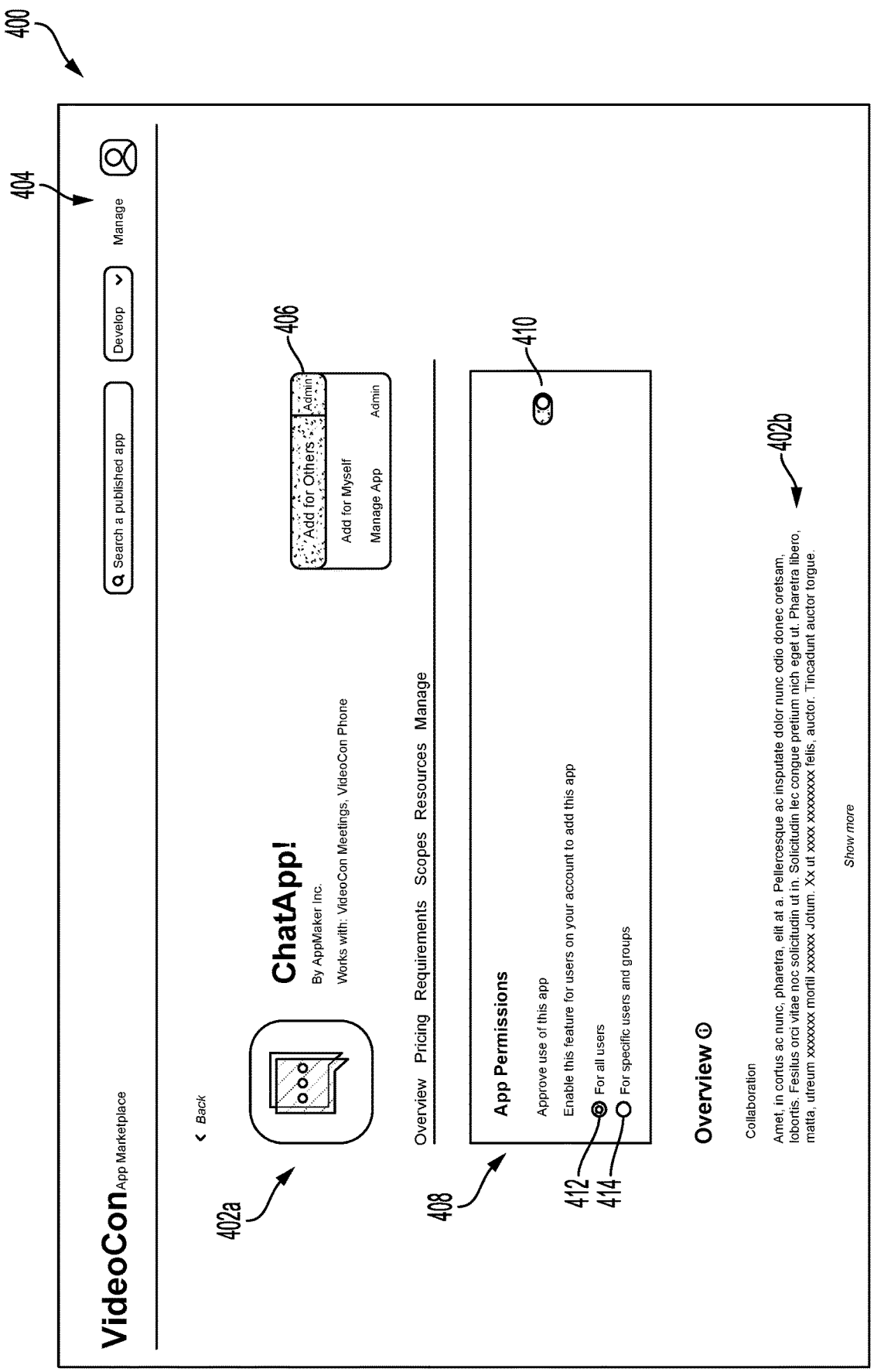
FIGS. 4A-E show illustrations of example graphical user interfaces that may be used with a system for providing administrator-authorized applications during video conferencing, according to some aspects of the present disclosure.

Turning next to FIGS. 4A-E, FIGS. 4A-E show illustrations of example graphical user interfaces (GUIs) that may be used with a system for administrator-authorized applications during video conferencing. FIG. 4A shows an example application configuration GUI 400. The application configuration GUI 400 may be used by administrator 318 to create, update, query, and delete authorizations associated with integrations 320 and applications 322 on behalf of users that are a member of administered group 340. Integrations 320 and applications 322 are referred to collectively as an "application."

Application configuration GUI 400 may be accessed by a group 340 administrator 318. Administrator profile controls 404 may indicate the identity of the properly authenticated administrator 318 as well as information about administrator roles, permissions, environments, and so on. Application configuration GUI 400 includes information about an application 402a, 402b. For instance, the information 402a may include application name, icon, author, compatibility information and so on. The information 402b may further include a description and other information relevant to installation, use, and maintenance of the application.

Application configuration GUI 400 includes controls for configuring administrator-authorized applications. Control 406 is a drop down menu for selecting the current function of the application configuration GUI 400. For example, control 406 may include configuration modes including adding an application for use, configuration, or testing by administrator 318; adding an application for other users; or managing the application, among other possible selections. Certain selections possible using control 406 contain the word "Admin" to indicate that the function is only available to authenticated administrators 318. Application configuration GUI 400 illustrates the "adding an application for other users" mode. In some example GUIs 400, the GUI 400 may refresh to display different control sets as the control 406 selection is changed.

In "adding an application for other users" mode, application configuration GUI 400 includes an application permissions selector panel 408. In application permissions selector panel 408, authorization for the application to access protected resources on behalf of one or more users is granted using toggle control 410. Upon granting authorization on behalf of one or more users using toggle control 410, additional controls for providing granularity in the selection of the one or more users may be shown. For instance, such controls may become enabled. The controls may include a selector control 412 to authorize the application on behalf of all users. The controls may include a selector control 414 to authorize the application on behalf of specific users or groups. In some examples, selection of selector control 414 may cause additional controls to become enabled that allow for the selection of specific users, groups, or other means for selecting subsets of users.

Figure 4C:
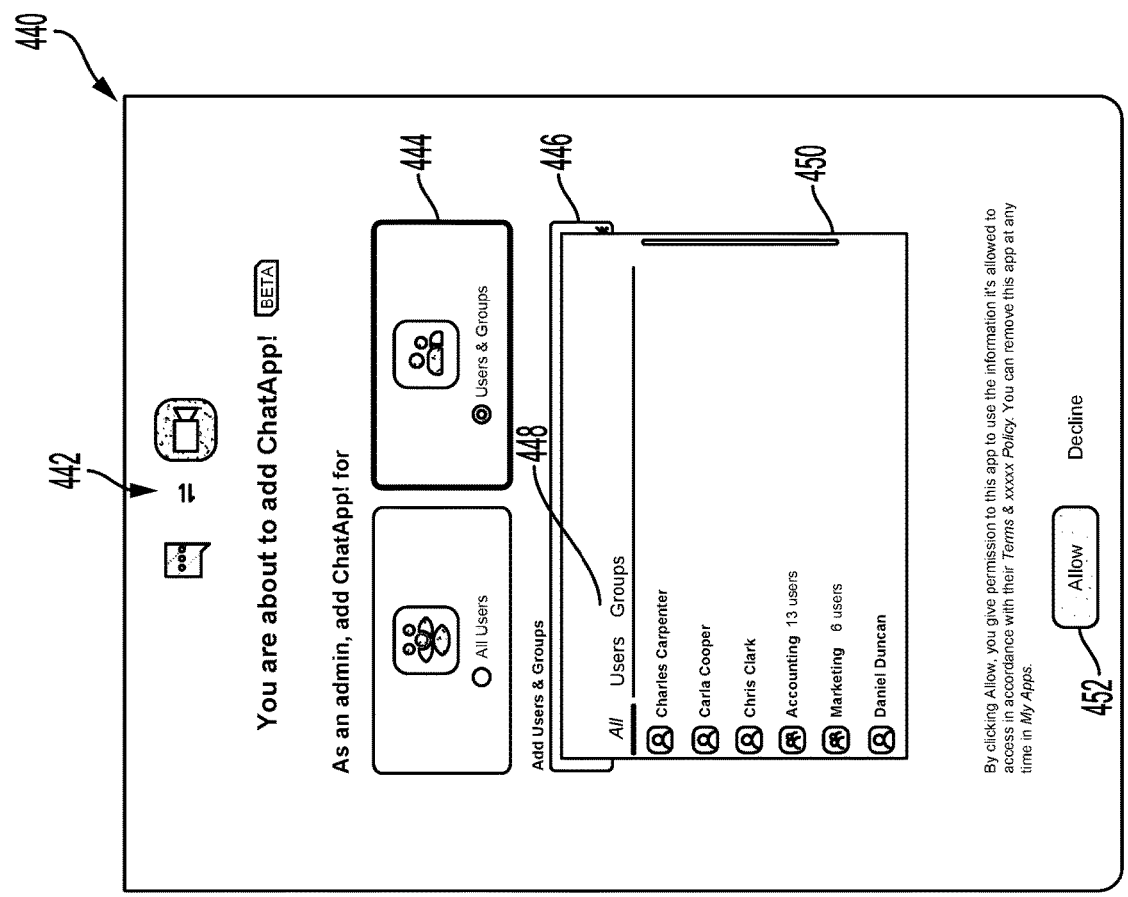
Figure 4B:
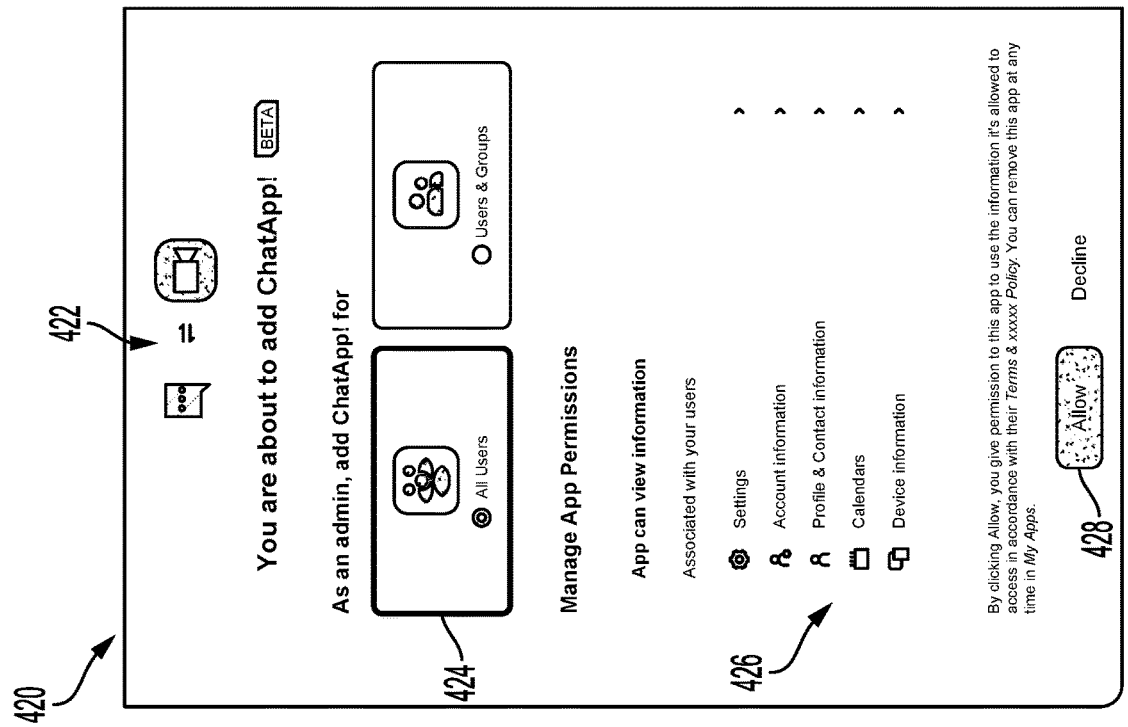

FIGS. 4B and 4C show example GUIs for viewing authorization scopes, authorization permissions, and user subsets. FIG. 4B shows example GUI 420 for authorizing an application on behalf of one or more users and for managing application permissions. GUI 420 may include information 422 about the application like the application name, icon, beta test status, and so forth. The controls may include a selector control 424 to authorize the application on behalf of all users or to authorize the application on behalf of specific users or groups. In some examples, specifying authorization of the application on behalf of specific users or group with control 424 may cause additional controls to become enabled that allow for the selection of specific users, groups, or other means for selecting subsets of users, as shown in FIG. 4C.

Application authorization permissions and scopes 426 are shown in GUI 420. Application authorization permissions and scopes 426 may include a list of protected resources available from the video conference provider 302 and the nature of the access the application will have with respect to that protected resource. Generally, application authorization permissions refer to what and when a particular application can do. For example, authorization permission examples include writing profile data, reading calendar data, or editing account information. Application scopes refer to who may perform those permissions. For example, permissions may be scoped to users, groups, or administrators.

In some examples, the application authorization permissions and scopes 426 can be updated. For example, the application authorization permissions and scopes control 426 may, responsive to the "Account Information" section being clicked, show a dialog (not shown) that describes the information available under this category and indicates that both read and write permissions can be granted. The application authorization permissions and scopes control 426 may further allow the administrator 318 to change these selections, for example, by allowing read but not write permissions. However, in some cases, making such adjustments may cause some applications 322 to not work correctly. Therefore, in some examples, the application authorization permissions and scopes control 426 may disable the ability to change permissions that can cause such a performance degradation. Upon completion of the desired configuration, the authorization may be allowed or declined using confirmation button control 428.

FIG. 4C shows example GUI 440 for authorizing an application on behalf of one or more users and for managing application permissions. GUI 440 may include information 442 about the application like the application name, icon, beta test status, and so forth. The controls may include a selector control 444 to authorize the application on behalf of all users or to authorize the application on behalf of specific users or groups. In some examples, specifying authorization of the application on behalf of specific users or group with control 444 may cause additional controls to become enabled that allow for the selection of specific users, groups, or other means for selecting subsets of users.

For example, selector control 444 is shown with "Users & Groups" selected, which has enabled the add users and groups control 446. The add users and groups control 446 can be used to identify specific users, groups of users, or other means of identifying subsets of users. For example, all user profiles with a particular tag may be used to identify a subset of users. The add users and groups control 446 includes a subset selector control 448. Subset selector control 448 shows selections for all (e.g., users and groups), users, and groups, but other means for specifying subsets of users may be used. The user selection of subset selector control 448 may cause subset options menu 450 to show a list of all available users. In contrast, the group selection of subset selector control 448 may cause subset options menu 450 to show all available groups. For instance, video conference provider 302 may include a profile service that allows for the definition of groups, like Accounting, Marketing, and so on. The all selection for subset selector control 448 may display both lists combined, interleaved or in sequence. Upon completion of the desired configuration, the authorization may be allowed or declined using confirmation button control 452.

Figure 4D:
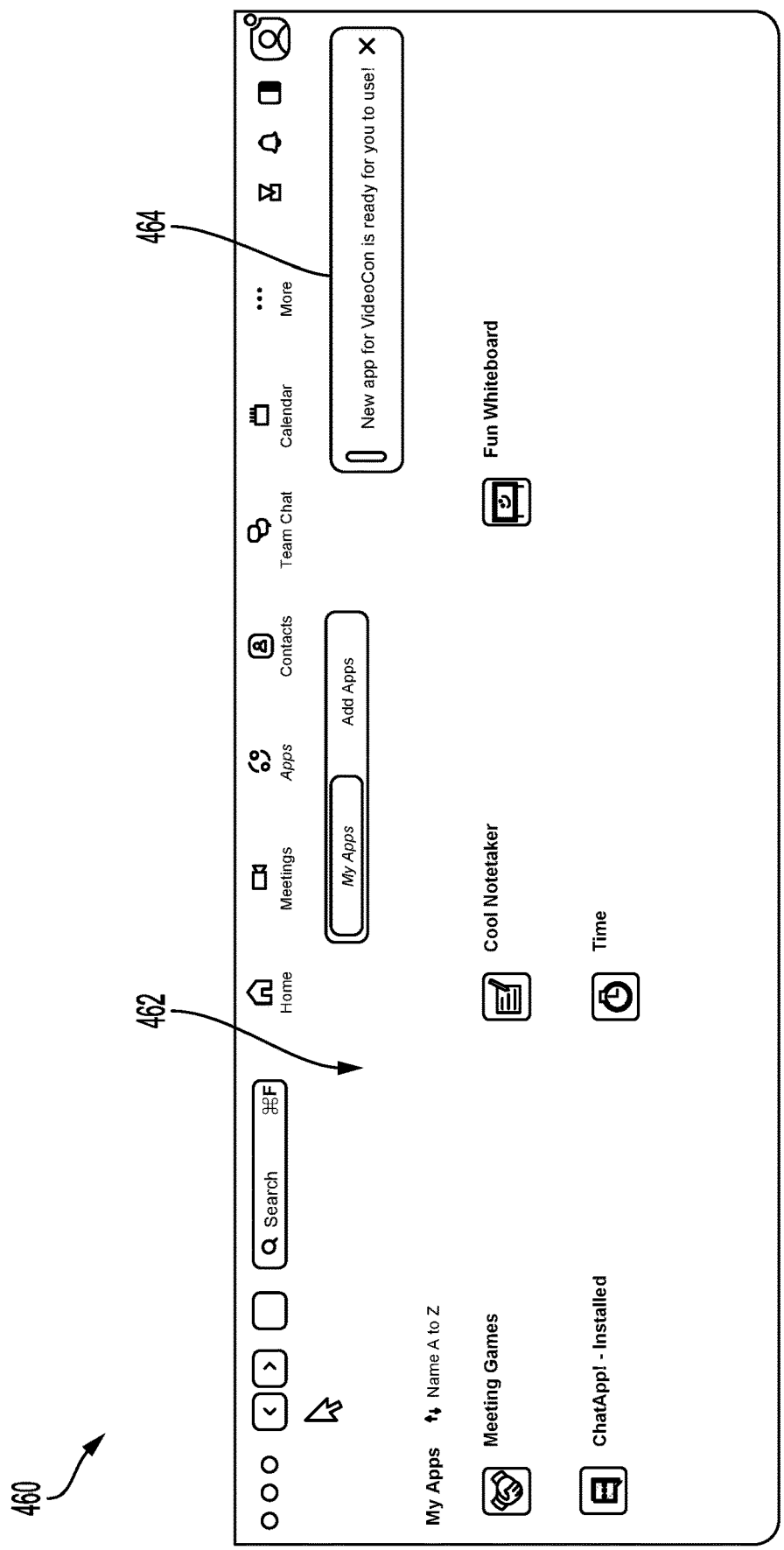
Figure 4E:
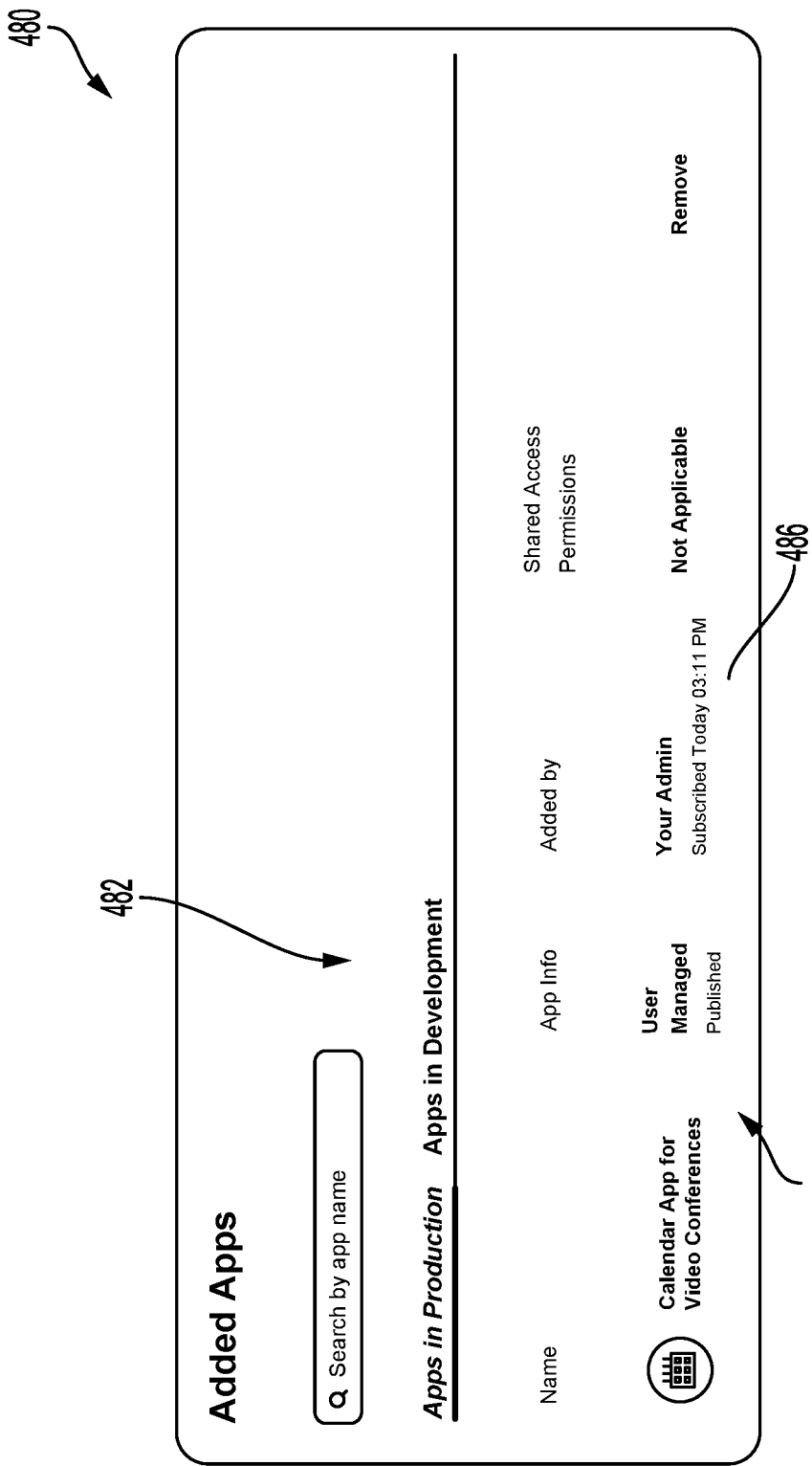

FIGS. 4D and 4E show example GUIs that may be displayed on a client device 306 when an administrator 318 has authorized access to a protected resource for an application on behalf of the user 316 of that client device 306. In some examples, such authorization may be configured to be immediately followed by installation of the application such that the two operations are indistinguishable the point of view of the user 316.

FIG. 4D shows example GUI 460 showing installed applications 322 on client device 306. The GUI 460 includes a list of installed applications 462. In some examples, the applications in list 462 may be clicked to show a configuration screen that may allow for examples such as managing authorizations. For instance, the configuration screen (not shown) may provide a control for a user 316 to revoke the authorization granted on their behalf. Other possible configuration options include application-specific configuration settings, installation controls (e.g., an uninstall control), or configurations relating to video conferences. In some examples, the administrator 318 may configure the application to disallow certain configuration settings. For instance, the administrator 318 may disallow revocation of authorization for applications 322 that are mandatory for a particular group 340 or organization.

GUI 460 includes notification 464 that indicates that a particular application has been installed automatically. Implicit with this notification 464 is notification to the user that access to protected resources has been authorized on behalf of the user.

FIG. 4E shows example GUI 480 showing added integrations 320 on client device 306. The GUI 480 includes a list of added integrations 482. The list of added integrations 482 includes added integration 484, which can include information about the integration name, the responsible administrator 318, permissions, and so on. In particular, added integration 484 includes notification 486 that the integration was added, including a timestamp indicating when the integration 484 was added. As with notification 464, implicit with this notification 486 is notification to the user that access to protected resources has been authorized on behalf of the user.

Figure 5:
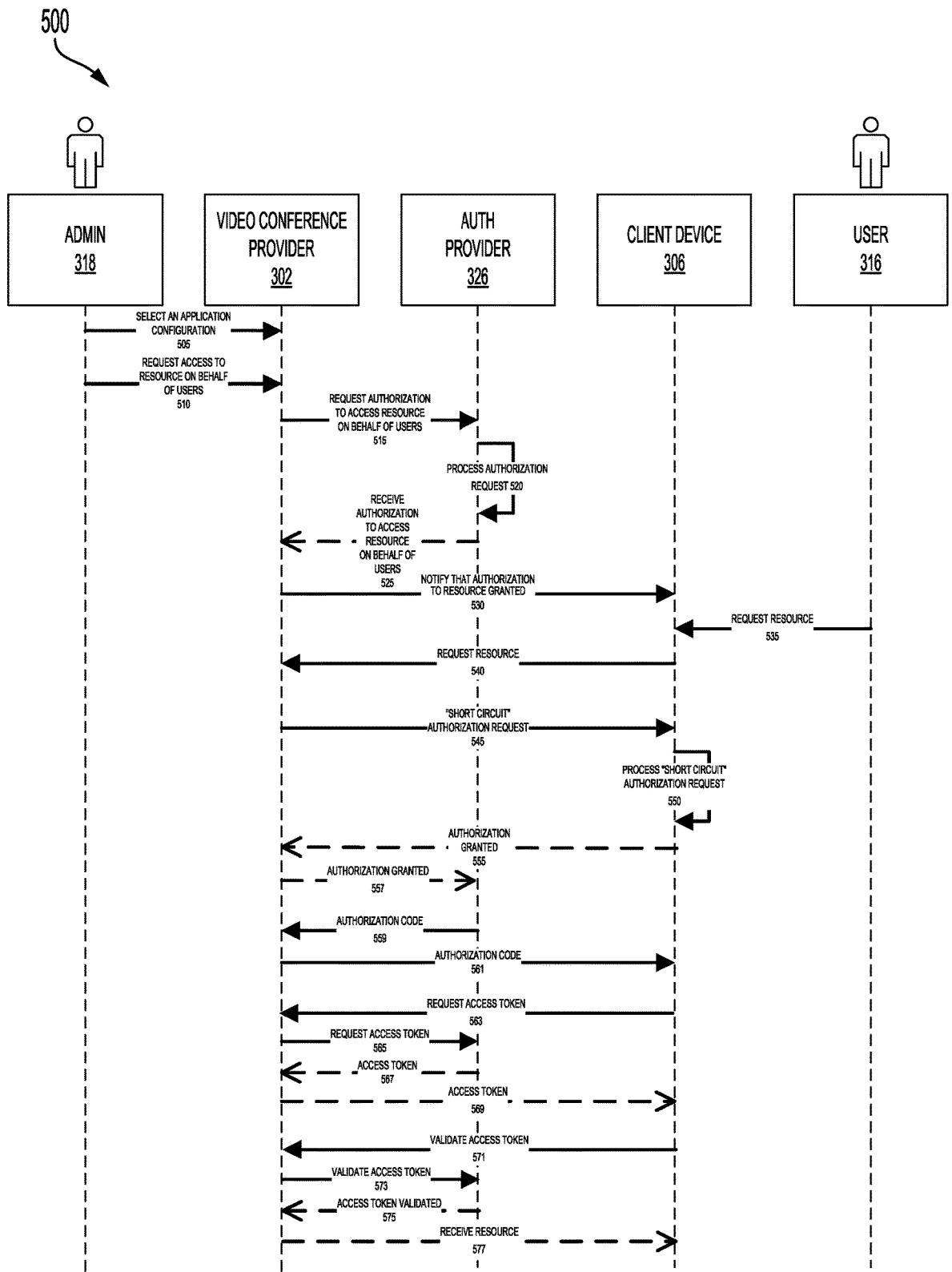
FIG. 5 shows an example sequence diagram illustrating an example transaction for providing administrator-authorized application during video conferencing, according to some aspects of the present disclosure.

Referring now to FIG. 5, FIG. 5 shows an example sequence diagram 500 of a transaction among administrator 318, video conference provider 302, authorization provider 326, client device 306, and user 316 illustrating administrator-authorization applications. In sequence diagram 500, the actors are administrator 318 and user 316, indicated by the figure symbol at the top of the sequence diagram. Computing devices involved include video conference provider 302, authorization provider 326, and client device 306. This is one possible configuration for administrator-authorization applications and other configurations are also possible. In sequence diagram 500, messages such as API requests are indicated with solid lines and messages in response are to such requests are indicated with dotted lines. For instance, a response message may contain requested data or information about an authorization. The events are ordered chronologically beginning with the earliest time at the top of the sequence diagram.

It should be appreciated that sequence diagram 500 shows a particular sequence for providing for administrator-authorized application during video conferencing. Other sequences of operations may also be performed according to alternative examples. For example, alternative examples of the present disclosure may perform the steps shown in a different order. Moreover, the individual operations illustrated by sequence diagram 500 may include multiple sub-operations that may be performed in various sequences as appropriate to the individual operation. Furthermore, additional operations may be added or removed depending on the particular applications. Further, the operations described in sequence diagram 500 may be performed by different devices. One of ordinary skill in the art would recognize many variations, modifications, and alternatives. Integrations 320 and applications 322 are referred to collectively as an "application."

In message 505, an administrator 318 selects an application configuration. For example, the administrator 318 may use a GUI similar to the example depicted in FIG. 4A to select an application for configuration. In some examples, the administrator 318 can make the selection using a suitable API or command line tool. Message 505 may include information about which application will be configured and security information about the administrator 318, including roles and privileges relating to which configurations the particular administrator 318 has the authority to update.

In message 510, the administrator 318 requests access to a protected resource, by the application, on behalf of one or more users. For example, the administrator 318 may use a GUI similar to the examples depicted in FIGS. 4A-C to provide an indication of the request to the video conference provider 302 by using a suitable control, like control 406 and 452. These controls may cause requests to API endpoints at the video conference provider 302 that include a data structure populated with information for authorizing access on behalf of one or more users. For instance, the API request may include a JavaScript Object Notation (JSON) with information like the application or a suitable identifier and information about which users and groups the authorization should be on behalf of.

Message 515 proxies the received request to the authorization provider 326. Proxies, as used herein, refers to a server configuration in which an API request is forwarded to another API endpoint. For instance, the video conference provider 302 may provide an endpoint for requesting authorization on behalf of one or more users. The authorization provider 326 may provide an identical endpoint. However, the administrator 318 is authenticated to the video conference provider 302, not the authorization provider 326. The video conference provider 302 is likewise authenticated to the authorization provider 326 and controls access to the authorization provider 326 based on access controls operated by the video conference provider 302. In some examples, however, the video conference provider 302 includes the authorization provider 326, in which case the authorization provider 326 is simply a subsystem of the video conference provider 302.

At message 520, the authorization provider 326 processes the request to authorize the application on behalf of the one or more users. For example, the authorization provider 326 may perform operations such as access a database, check credentials, perform various cryptographic operations, or communicating with an identity provider to process the authorization request.

Upon determining that the authorization request is valid, the authorization provider 326 returns the authorization to video conference provider 302 at message 525. For example, the authorization may be a JSON object that includes information indicating that the grant of authorization was successful. In some examples, the authorization may include a valid access token(s) that may be relayed to client devices immediately for accessing the protected resource. In some examples, the authorization may include an authorization code that can be used to obtain an access token. In some examples, the video conference provider 302 may store the authorization code or the access token. In some examples, the video conference provider 302 may storage information about the granted authorization and then later use a "short-circuit" mechanism to obtain another access token when it is needed, as described below and in FIG. 3 and the accompanying description.

At message 530, the client device 306 receives a notification that authorization to access the protected resource has been granted. In some examples, this may be cause the application to be installed or added, as shown in FIGS. 4D-E. In other examples, this may cause a notification or other indication to be provided to the user 316 that the application is available for installation or adding. In some other examples, the user 316 may receive an email or other notification indicating that authorization for access to the protected resource has been granted on their behalf, including detailed information about the authorization for auditing purposes.

Message 535 is sent from client device 306 at some point in the future when user 316 takes an action using the application that requires access to the protected resource. For example, if the application is a chat application, upon invocation of the application during a video conference, the chat application may require access to profile information about the user 316 to provide chat functionality during the video conference.

At message 540, the client device 306 sends the request for the protected resource to the video conference provider 302. For example, after the user 316 requests the resource in 535 by, for example, clicking on the icon of the chat application, during startup or initialization of the application, the protected resource may be requested from the video conference provider 302 using a suitable API endpoint.

At message 545, the video conference provider 302 requests a short-circuit authorization from the client device 306. For example, the video conference provider 302 may request a short-circuit authorization from the client device 306 that includes information about previously granted authorizations either by user 316 or by administrator 318 on behalf of user 316 when such delegation has been explicitly authorized. In some examples, the request for authorization in message 545 does not explicitly specify a short-circuit process and is a standard request for authorization. In such cases, the initialization of the short-circuit process may occur in client device 306.

At message 550, the client device 306 processes the short-circuit authorization request. For example, the short-circuit process can involve granting authorization on the basis of authorization previously granted by the user 316 or explicitly delegated to an administrator 318 and granted on behalf of the user 316. For example, an in-client authorization technique may be used whereby the user 316 of client device 306 sees no indication of the authorization process in progress because authorization has already been granted on behalf of user 316 by administrator 318. Thus, from the standpoint of user 316, the "short-circuited" authorization process may not show any indication of occurring on a display of client device 306.

Message 555 includes the granting of the authorization by the client device 306 via the short-circuit process. The granting of the authorization using the short-circuit process may be identical to the message that would follow from an explicit grant of authorization. In some cases, an in-client authorization technique may be implemented whereby the authorization grant proceeds as if the user 316 of client device 306 explicitly granted authorization using a user interface. Thus, the granting of the authorization in the "short-circuited" authorization process may otherwise follow the standard OAuth2 authorization flow. The granting of the authorization flow is then proxied to the authorization provider 326 at message 557.

Messages 559-575 relate to the provision of an authorization code, exchange of the authorization code for an access token, and validation of the access token, as discussed above with respect to a typical OAuth2 authorization code flow. At message 559, an authorization code is sent from the authorization provider 326 to the video conference provider 302. The video conference provider 302 relays the authorization code to the client device 306 at message 561. The client device 306 may then request an access token using the authorization code at message 563. The request for an access token may be proxied or relayed to the authorization provider 326 by the video conference provider 302 at message 565. At messages 567 and 569 an access token is sent from the authorization provider 326 to the video conference provider 302, and then from the video conference provider 302 to the client device 306. The access token is validated at messages 571, 573, and 575 using a similarly ordered exchange among the client device 306, the video conference provider 302, and the authorization provider 326.

Following message 575, access to the protected resource is authorized. Upon receipt of the authorization to access the protected resource on behalf of the user 316, the video conference provider 302 can access the protected resource on behalf of the user 316. For example, the protected resource may be profile data stored in a database. In this case, the video conference provider 302 can query the database based on the information included in the resource request message 540. For example, the database may be queried using information identifying the application, the client device 306, the user 316, or other identifiers.

Message 571 includes the protected resource and is sent to the client device 306 for use by the application. If the protected resource is profile data, the message 560 may include a JSON object that includes the requested profile information. The application executing on client device 306 can use the profile information to populate GUI elements or enable other functionality upon receipt of the profile information.

Figure 6:
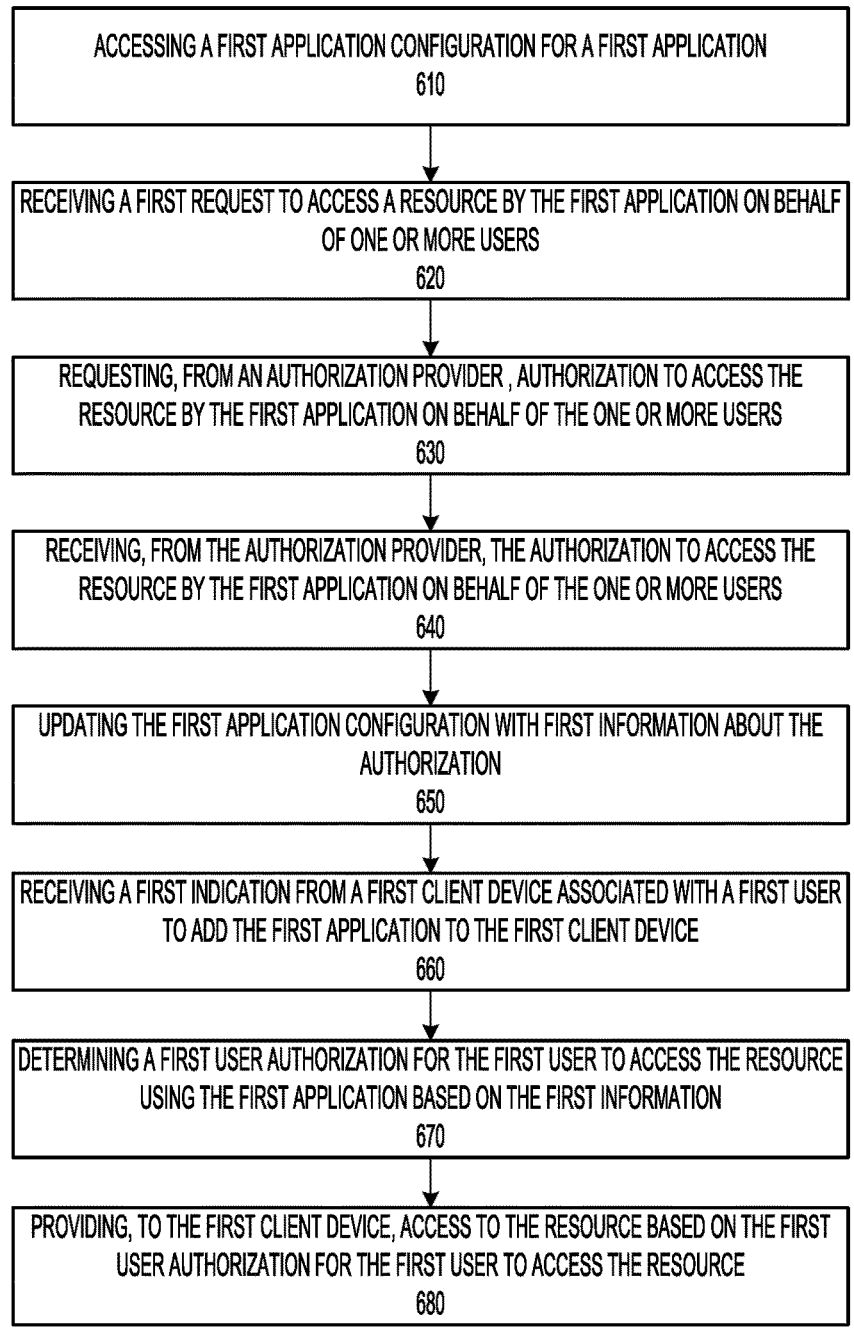
FIG. 6 shows a flowchart of an example method for providing administrator-authorized application during video conferencing, according to some aspects of the present disclosure.

Referring now to FIG. 6, FIG. 6 shows a flowchart of an example method 600 for providing administrator-authorized application during video conferencing, according to some aspects of the present disclosure. The description of the method 600 in FIGS. 6A-B will be made with reference to FIGS. 3-5, however any suitable system according to this disclosure may be used, such as the example systems 100 and 200, shown in FIGS. 1 and 2.

It should be appreciated that method 600 provides a particular method for providing services for administrator-authorized application during video conferencing. Other sequences of operations may also be performed according to alternative examples. For example, alternative examples of the present disclosure may perform the steps outlined above in a different order. Moreover, the individual operations illustrated by method 600 may include multiple sub-operations that may be performed in various sequences as appropriate to the individual operation. Furthermore, additional operations may be added or removed depending on the particular applications. Further, the operations described in method 600 may be performed by different devices. For example, the description is given from the perspective of the video conference provider 302 but some embodiments of method 600 could be performed by another server like the authorization provider 326. One of ordinary skill in the art would recognize many variations, modifications, and alternatives. As used below, the "first application" may refer to any of the integrations 320 and or applications 322 described in FIG. 3 and the accompanying description.

The method 600 may include block 610. At 610, video conference provider 302 accesses a first application configuration for a first application of a plurality of applications, the first application configuration applicable to a plurality of client devices, each client device having at least one associated user of a plurality of users. As shown in FIG. 5 and the accompanying description, example method 600 may be initiated with message 505, the selection of an application configuration by the administrator 318 using, for example, a suitable GUI (e.g., GUI 400 of FIG. 4A). The selection may cause a request to be sent to a suitable API endpoint on the video conference provider 302.

FIG. 3 depicts group 340 that includes client devices 304, 306 of users 314, 316 respectively. The administrator 318 can manage integrations 320 and applications 322 for the group 340, including execution of administrator-authorized applications. The application configuration accessed in block 610 may have applicability to one or more client devices 304, 306 in group 340. In some examples, the extent of this applicability may be configured by the administrator 318. For example, an application configuration can be configured to only apply to a subset of the user client devices 304, 306.

In some examples, the application configuration may be accessed using a command line tool. In some other examples, application configuration may occur by way of manual editing of configuration files.

At block 620, video conference provider 302 receives a first request to access a resource by the first application on behalf of one or more users. For example, using the controls in example GUIs 400, 420, and 440 of FIGS. 4A-C, the administrator 318 can cause an indication to be generated indicative of a desire to access a resource by the first application on behalf of one or more users. Such access may be necessary to, for example, pre-install certain integrations 320 or applications 322 on client devices 304, 306 in group 340. For instance, a particular group 340 may have policies requiring all members to use a particular chat application during video conferencing. The administrator 318 can request to access a resource by the first application-in this case the chat application-on behalf of one or more users, which may be a prerequisite for pre-installing this chat application on new client devices 304, 306 of users 314, 316 newly added to the group 340.

At block 630, video conference provider 302 requests, from an authorization provider 326, authorization to access the resource by the first application on behalf of the one or more users. For example, as shown in FIG. 5 and the accompanying description, the video conference provider 302 may proxy the request made in block 620. In some examples, however, the API endpoint at the video conference provider 302 may differ from the API endpoint at the authorization provider 326, in which case the request to access the resource by the first application on behalf of the one or more users cannot be simply proxied. For instance, information contained in the request may need to be repackaged in a new data structure or additional authentication credentials may need to be included. In an implementation utilizing the OAuth2 client credential grant type, for instance, the client (the video conference provider 302, in this case) ID and client secret may be included in the request to the authorization provider 326.

At block 640, video conference provider 302 receives, from the authorization provider 326, the authorization to access the resource by the first application on behalf of the one or more users. For example, the authorization provider 326 may first authenticate the video conference provider 302 by examining credentials included in the authorization request. Then, upon determining that the request is valid, the authorization provider 326 may generate and store a data structure associated with the granted authorization. For example, every non-revoked authorization grant may have an associated data structure stored by the authorization provider 326. Subsequent requests for, for example, access tokens, may first be checked for a valid, unexpired authorization grant. In the event one is not found, the full authorization process may be repeated, again requiring explicit consent from either a user 316 or administrator 318.

In some examples, the authorization provider 326 may receive a request to revoke the authorization to access to the resource by the first application on behalf of a subset of the one or more users from the video conference provider 302. For example, one or more other users of the one or more users may be specified in the request. Such a request may be caused by, for example, a manual action of the administrator to change the application configuration. In some examples, revocations may be automatically triggered as when, for instance, a user leaves a group 340. The authorization provider 326 may return an indication of the revocation of the authorization to access to the resource by the first application on behalf of the subset of the one or more users. At the same time, the data structure containing information relating to the authorization grant may be updated or deleted upon revocation of some or all of the granted scope. In some examples, upon revocation of the authorization grant, the grant is deleted and authorization must be reperformed by the user 316 or administrator to obtain a new grant containing the remaining portion of the one or more users. In an example in which the subset includes the first user 316, the video conference provider 302 may output a command to cause the first client device 306 to provide an indication that the authorization to access to the resource by the first user has been revoked.

At block 650, video conference provider 302 updates the first application configuration with first information about the authorization to access the resource by the first application on behalf of the one or more users. For example, the video conference provider 302 may receive information about granted authorization and update the stored application configuration so that the GUI 400 of FIG. 4A can correctly reflect the status of the authorization grant. For instance, GUI 400 may be updated so show that authorization was granted, when it was granted, and to which users and groups authorization was granted. GUI 400 may also be updated to include information about granted scopes, expiration times, permissions, among other information relating to the granted authorization.

At block 660, video conference provider 302 receives a first indication from a first client device 306 associated with a first user 316 to add the first application to the first client device 306. For example, a user 316 that is new to group 340 may attempt to install an application that is required for members of group 340. In some examples, a script or other means of automation may be used to initiate the installation of the application. The first indication may be sent to the video conference provider 302 by the application executing on the client device 306 or by the video conference client software executing on client device 306.

At block 670, video conference provider 302 determines a first user authorization for the first user 316 to access the resource using the first application based on the first information about the authorization to access the resource by the first application on behalf of the one or more users. For example, the video conference provider may make a short-circuit authorization request to the authorization provider 326. The authorization provider 326 can process the short-circuit authorization request. For instance, the short-circuit authorization request may be an OAuth2 authorization request using the client credentials grant type. The request may include authentication information like the client ID and the client secret, that securely authentication the video conference provider 302 to the authorization provider 326. The use of the client credentials grant type in this way is predicated upon the user 316 having explicitly delegated the granting of authorization on their behalf to the administrator 318, as is typical in a corporate or organizational setting.

Upon determining that a valid grant exists and that the short-circuit request is valid and properly authenticated, the authorization provider 326 may return the means to access the protected resource to the video conference provider 302. For example, the authorization provider 326 may return an access token. In some examples, an in-client authorization technique may be used whereby the user 316 of client device 306 sees no indication of an authorization process in progress because authorization has already been granted on behalf of user 316 by administrator 318.

At block 680, video conference provider 302 provides, to the first client device 306, access to the resource based on the first user authorization for the first user 316 to access the resource. For example, the video conference provider 302 can relay the access token received in block 670 to the client device 306. The first application executing on the client device 306 can then use the access token to access the protected resource subject to the limited scope and duration of the issued access token.

Figure 7:
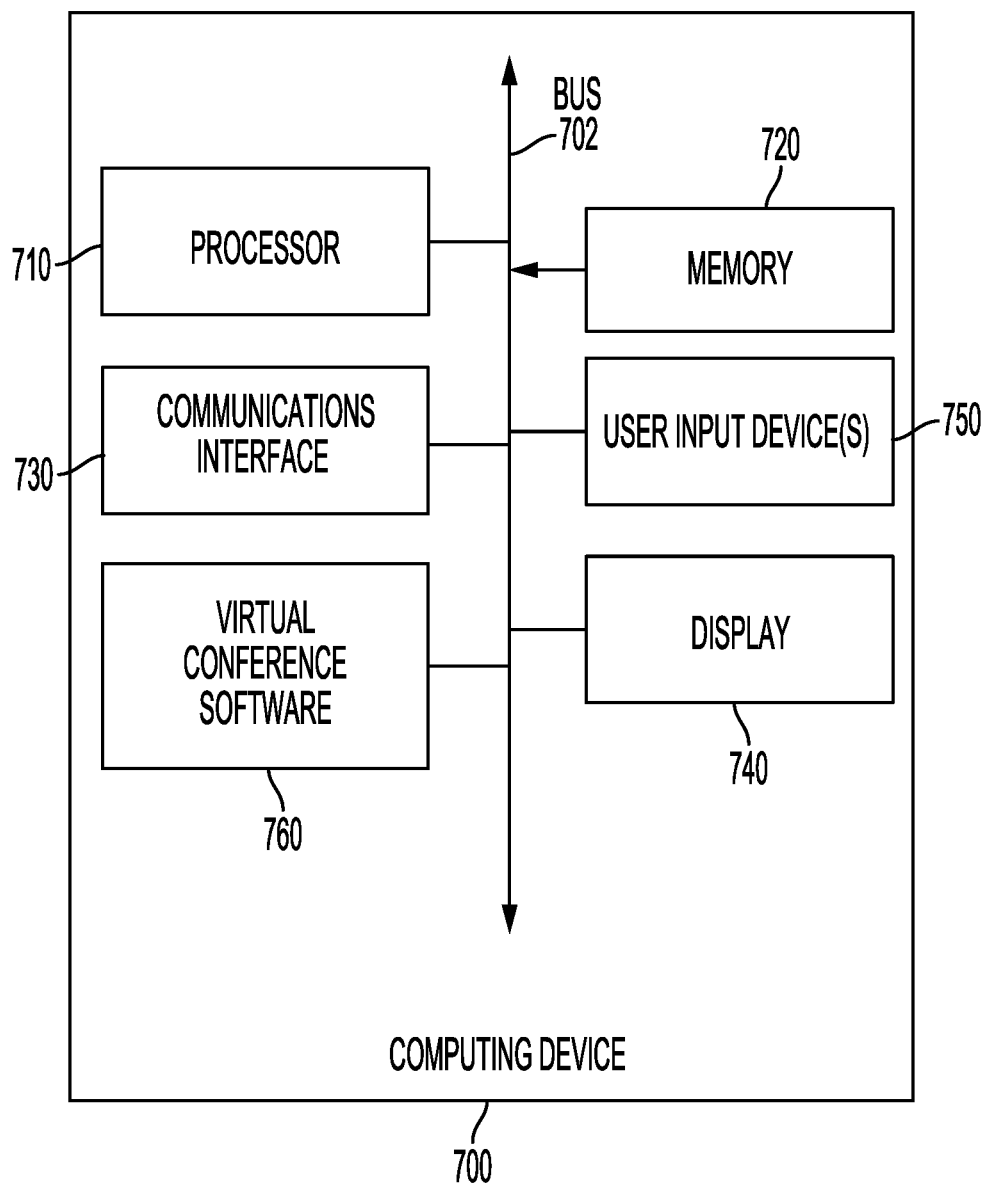
FIG. 7 shows an example computing device suitable for use in example techniques for providing administrator-authorized applications during video conferencing, according to some aspects of the present disclosure.

Referring now to FIG. 7, FIG. 7 shows an example computing device 700 suitable for use in example techniques for providing administrator-authorized applications during video conferencing according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more techniques for providing administrator-authorized applications during video conferencing according to different examples, such as part or all of the example method 600 described above with respect to FIG. 6. The computing device 700, in this example, also includes one or more user input devices 750, such as a keyboard, mouse, touchscreen, microphone, etc., to accept user input. The computing device 700 also includes a display 740 to provide visual output to a user.

In addition, the computing device 700 includes virtual conferencing software 760 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method, comprising: accessing a first application configuration for a first application of a plurality of applications, the first application configuration applicable to a plurality of client devices, each client device having at least one associated user of a plurality of users; receiving a first request to access a resource by the first application on behalf of one or more users; requesting, from an authorization provider, authorization to access the resource by the first application on behalf of the one or more users; receiving, from the authorization provider, the authorization to access the resource by the first application on behalf of the one or more users; updating the first application configuration with first information about the authorization to access the resource by the first application on behalf of the one or more users; receiving a first indication from a first client device associated with a first user to add the first application to the first client device; determining a first user authorization for the first user to access the resource using the first application based on the first information about the authorization to access the resource by the first application on behalf of the one or more users; and providing, to the first client device, access to the resource based on the first user authorization for the first user to access the resource.

Example 2 is the method of example(s) 1, wherein the first application is configured for use during a video conference hosted by a video conference provider, wherein the video conference includes one or more client devices of the plurality of client devices.

Example 3 is the method of example(s) 1, further comprising outputting a first command to cause the first client device to generate a notification of the authorization to access the resource by the first application on behalf of the first user.

Example 4 is the method of example(s) 3, further comprising outputting a second command to cause the first client device to provide a second indication that the first application has been added to the first client device.

Example 5 is the method of example(s) 1, wherein the first application is an integration comprising information for communicatively coupling a client device to a web application.

Example 6 is the method of example(s) 1, wherein the first application comprises a software package installed on a client device.

Example 7 if the method of example(s) 1, wherein requesting, from the authorization provider, the authorization to access the resource by the first application on behalf of the one or more users comprises: identifying one or more authorization scopes; and identifying one or more authorization permissions.

Example 8 is the method of example(s) 1, wherein the one or more users is a subset of the plurality of users.

Example 9 is the method of example(s) 1, wherein the one or more users comprises a second user and a third user.

Example 10 is the method of example(s) 1, further comprising: receiving a second request to revoke the authorization to access to the resource by the first application on behalf of a subset of the one or more users, wherein the subset of the one or more users includes the first user; requesting, from the authorization provider, revocation of the authorization to access to the resource by the first application on behalf of the subset of the one or more users; receiving, from the authorization provider, a second indication of the revocation of the authorization to access to the resource by the first application on behalf of the subset of the one or more users; and outputting a command to cause the first client device to provide a third indication that the authorization to access to the resource by the first user has been revoked.

Example 11 is the method of example(s) 1, wherein providing, to the first client device, access to the resource based on the first user authorization for the first user to access the resource comprises: receiving, from the first client device, a second request to access the resource; requesting, from the first client device, an authorization to access the resource; receiving, from the first client device, an indication of an authorization grant, wherein the authorization grant is automatically generated based on the first user authorization for the first user to access the resource; and providing one or more credentials for accessing the resource based on the authorization grant.

Example 12 is a non-transitory computer-readable medium storing instructions that, when executed by one or more processors, cause the one or more processors to perform operations including: accessing a first application configuration for a first application of a plurality of applications, the first application configuration applicable to a plurality of client devices, each client device having at least one associated user of a plurality of users; receiving a first request to access a resource by the first application on behalf of one or more users; requesting, from an authorization provider, authorization to access the resource by the first application on behalf of the one or more users; receiving, from the authorization provider, the authorization to access the resource by the first application on behalf of the one or more users; updating the first application configuration with first information about the authorization to access the resource by the first application on behalf of the one or more users; receiving a first indication from a first client device associated with a first user to add the first application to the first client device; determining a first user authorization for the first user to access the resource using the first application based on the first information about the authorization to access the resource by the first application on behalf of the one or more users; and providing, to the first client device, access to the resource based on the first user authorization for the first user to access the resource.

Example 13 is the non-transitory computer-readable medium of example(s) 12, further comprising instructions for: outputting a first command to cause the first client device to generate a notification of the authorization to access the resource by the first application on behalf of the first user, wherein the notification includes information about the authorization to access the resource by the first application on behalf of the first user; and outputting a second command to cause the first client device to provide a second indication that the first application has been added to the first client device, wherein the second indication is displayed on a display device of the first client device.

Example 14 is the non-transitory computer-readable medium of example(s) 12, wherein the first application is an integration comprising information for communicatively coupling a client device to a web application.

Example 15 is the non-transitory computer-readable medium of example(s) 12, wherein the first application comprises a software package installed on a client device.

Example 16 is the non-transitory computer-readable medium of example(s) 12, wherein the one or more users comprises one of a subset of the plurality of users or a second user and a third user.

Example 17 is the non-transitory computer-readable medium of example(s) 12, further comprising: accessing a second application configuration for one or more applications; receiving a second request to access the resource by the one or more applications on behalf of the one or more users; requesting, from the authorization provider, authorization to access the resource by the one or more applications on behalf of the one or more users; receiving, from the authorization provider, the authorization to access the resource by the one or more applications on behalf of the one or more users; updating the second application configuration with second information about the authorization to access the resource by the one or more applications on behalf of the one or more users; receiving a second indication from the first client device associated with the first user to add a second application from the one or more applications to the first client device; determining a second user authorization for the first user to access the resource using the second application based on the second information about the authorization to access the resource by the one or more applications on behalf of the one or more users; and providing, to the first client device, access to the resource based on the first user authorization using the second application.

Example 18 is the non-transitory computer-readable medium of example(s) 17, wherein the first application and the second application are configured for use during a video conference hosted by a video conference provider, wherein the video conference includes one or more client devices of the plurality of client devices.

Example 19 is a system comprising: one or more processors; and one or more computer-readable storage media storing instructions which, when executed by the one or more processors, cause the one or more processors to perform operations including: accessing a first application configuration for a first application of a plurality of applications, the first application configuration applicable to a plurality of client devices, each client device having at least one associated user of a plurality of users, wherein the first application is configured for use during a video conference hosted by a video conference provider, wherein the video conference includes one or more client devices of the plurality of client devices; receiving a first request to access a resource by the first application on behalf of one or more users; requesting, from an authorization provider, authorization to access the resource by the first application on behalf of the one or more users; receiving, from the authorization provider, the authorization to access the resource by the first application on behalf of the one or more users; updating the first application configuration with first information about the authorization to access the resource by the first application on behalf of the one or more users; receiving a first indication from a first client device associated with a first user to add the first application to the first client device; determining a first user authorization for the first user to access the resource using the first application based on the first information about the authorization to access the resource by the first application on behalf of the one or more users; and providing, to the first client device, access to the resource based on the first user authorization for the first user to access the resource.

Example 20 is the system of example(s) 19, wherein the one or more users comprises one of a subset of the plurality of users or a second user and a third user.

That which is claimed is:

1. A method, comprising:
accessing a first application configuration for a first application of a plurality of applications, the first application configuration applicable to a plurality of client devices, each client device having at least one associated user of a plurality of users;
receiving a first request to access a resource by the first application on behalf of one or more users;
requesting, from an authorization provider, authorization to access the resource by the first application on behalf of the one or more users;
receiving, from the authorization provider, the authorization to access the resource by the first application on behalf of the one or more users;
updating the first application configuration with first information about the authorization to access the resource by the first application on behalf of the one or more users;
receiving a first indication from a first client device associated with a first user to add the first application to the first client device;
determining a first user authorization for the first user to access the resource using the first application based on the first information about the authorization to access the resource by the first application on behalf of the one or more users; and providing, to the first client device, access to the resource based on the first user authorization for the first user to access the resource.

2. The method of claim 1, wherein the first application is configured for use during a video conference hosted by a video conference provider, wherein the video conference includes one or more client devices of the plurality of client devices.

3. The method of claim 1, further comprising outputting a first command to cause the first client device to generate a notification of the authorization to access the resource by the first application on behalf of the first user.

4. The method of claim 3, further comprising outputting a second command to cause the first client device to provide a second indication that the first application has been added to the first client device.

5. The method of claim 1, wherein the first application is an integration comprising information for communicatively coupling a client device to a web application.

6. The method of claim 1, wherein the first application comprises a software package installed on a client device.

7. The method of claim 1, wherein requesting, from the authorization provider, the authorization to access the resource by the first application on behalf of the one or more users comprises:
identifying one or more authorization scopes; and
identifying one or more authorization permissions.

8. The method of claim 1, wherein the one or more users is a subset of the plurality of users.

9. The method of claim 1, wherein the one or more users comprises a second user and a third user.

10. The method of claim 1, further comprising:
receiving a second request to revoke the authorization to access to the resource by the first application on behalf of a subset of the one or more users, wherein the subset of the one or more users includes the first user;
requesting, from the authorization provider, revocation of the authorization to access to the resource by the first application on behalf of the subset of the one or more users;
receiving, from the authorization provider, a second indication of the revocation of the authorization to access to the resource by the first application on behalf of the subset of the one or more users; and
outputting a command to cause the first client device to provide a third indication that the authorization to access to the resource by the first user has been revoked.

11. The method of claim 1, wherein providing, to the first client device, access to the resource based on the first user authorization for the first user to access the resource comprises:
receiving, from the first client device, a second request to access the resource;
requesting, from the first client device, an authorization to access the resource;
receiving, from the first client device, an indication of an authorization grant, wherein the authorization grant is automatically generated based on the first user authorization for the first user to access the resource; and
providing one or more credentials for accessing the resource based on the authorization grant.

12. A non-transitory computer-readable medium storing instructions that, when executed by one or more processors, cause the one or more processors to perform operations including:
accessing a first application configuration for a first application of a plurality of applications, the first application configuration applicable to a plurality of client devices, each client device having at least one associated user of a plurality of users;
receiving a first request to access a resource by the first application on behalf of one or more users;
requesting, from an authorization provider, authorization to access the resource by the first application on behalf of the one or more users;
receiving, from the authorization provider, the authorization to access the resource by the first application on behalf of the one or more users;
updating the first application configuration with first information about the authorization to access the resource by the first application on behalf of the one or more users;
receiving a first indication from a first client device associated with a first user to add the first application to the first client device;
determining a first user authorization for the first user to access the resource using the first application based on the first information about the authorization to access the resource by the first application on behalf of the one or more users; and
providing, to the first client device, access to the resource based on the first user authorization for the first user to access the resource.

13. The non-transitory computer-readable medium of claim 12, further comprising instructions for:
outputting a first command to cause the first client device to generate a notification of the authorization to access the resource by the first application on behalf of the first user, wherein the notification includes information about the authorization to access the resource by the first application on behalf of the first user; and
outputting a second command to cause the first client device to provide a second indication that the first application has been added to the first client device, wherein the second indication is displayed on a display device of the first client device.

14. The non-transitory computer-readable medium of claim 12, wherein the first application is an integration comprising information for communicatively coupling a client device to a web application.

15. The non-transitory computer-readable medium of claim 12, wherein the first application comprises a software package installed on a client device.

16. The non-transitory computer-readable medium of claim 12, wherein the one or more users comprises one of a subset of the plurality of users or a second user and a third user.

17. The non-transitory computer-readable medium of claim 12, further comprising:
accessing a second application configuration for one or more applications;
receiving a second request to access the resource by the one or more applications on behalf of the one or more users;
requesting, from the authorization provider, authorization to access the resource by the one or more applications on behalf of the one or more users;

receiving, from the authorization provider, the authorization to access the resource by the one or more applications on behalf of the one or more users;

updating the second application configuration with second information about the authorization to access the resource by the one or more applications on behalf of the one or more users;

receiving a second indication from the first client device associated with the first user to add a second application from the one or more applications to the first client device;

determining a second user authorization for the first user to access the resource using the second application based on the second information about the authorization to access the resource by the one or more applications on behalf of the one or more users; and providing, to the first client device, access to the resource based on the first user authorization using the second application.

18. The non-transitory computer-readable medium of claim 17, wherein the first application and the second application are configured for use during a video conference hosted by a video conference provider, wherein the video conference includes one or more client devices of the plurality of client devices.

19. A system comprising:

one or more processors; and one or more computer-readable storage media storing instructions which, when executed by the one or more processors, cause the one or more processors to perform operations including:

accessing a first application configuration for a first application of a plurality of applications, the first application configuration applicable to a plurality of client devices, each client device having at least one associated user of a plurality of users, wherein the first application is configured for use during a video conference hosted by a video conference provider, wherein the video conference includes one or more client devices of the plurality of client devices;

receiving a first request to access a resource by the first application on behalf of one or more users;

requesting, from an authorization provider, authorization to access the resource by the first application on behalf of the one or more users;

receiving, from the authorization provider, the authorization to access the resource by the first application on behalf of the one or more users;

updating the first application configuration with first information about the authorization to access the resource by the first application on behalf of the one or more users;

receiving a first indication from a first client device associated with a first user to add the first application to the first client device;

determining a first user authorization for the first user to access the resource using the first application based on the first information about the authorization to access the resource by the first application on behalf of the one or more users; and providing, to the first client device, access to the resource based on the first user authorization for the first user to access the resource.

20. The system of claim 19, wherein the one or more users comprises one of a subset of the plurality of users or a second user and a third user.

\* \* \* \* \*